US00RE48130E

(19) United States
(12) Reissued Patent
Barnette et al.

(10) Patent Number: US RE48,130 E
(45) Date of Reissued Patent: Jul. 28, 2020

(54) METHOD FOR SWITCHING MASTER/SLAVE TIMING IN A 1000BASE-T LINK WITHOUT TRAFFIC DISRUPTION

(71) Applicant: Microsemi Storage Solutions, Inc., Aliso Viejo, CA (US)

(72) Inventors: James D Barnette, Austin, TX (US); Mandeep S Chadha, Austin, TX (US); James A McIntosh, Hutto, TX (US)

(73) Assignee: Microsemi Storage Solutions, Inc., Chandler, AZ (US)

(21) Appl. No.: 15/375,226

(22) Filed: Dec. 12, 2016

Related U.S. Patent Documents

Reissue of:
(64) Patent No.: 8,923,341
Issued: Dec. 30, 2014
Appl. No.: 13/005,515
Filed: Jan. 12, 2011

U.S. Applications:
(60) Provisional application No. 61/294,422, filed on Jan. 12, 2010.

(51) Int. Cl.
*H04L 7/00* (2006.01)
*H04J 3/06* (2006.01)
(Continued)

(52) U.S. Cl.
CPC ..... *H04J 3/0641* (2013.01); *H04L 12/42* (2013.01); *H04L 12/437* (2013.01); *H04L 7/0337* (2013.01)

(58) Field of Classification Search
CPC ..... H04J 3/0641; H04L 12/42; H04L 12/437; H04L 7/0337
(Continued)

(56) References Cited

U.S. PATENT DOCUMENTS 5,255,292 A * 10/1993 LaRosa et al. ..... 375/368
5,495,294 A * 2/1996 Evans et al. ..... 348/536
(Continued)

FOREIGN PATENT DOCUMENTS

EP 1936848 A1 12/2007
EP 1936848 A1 6/2008
(Continued)

OTHER PUBLICATIONS

International Search Report for corresponding application PCT/US2011/021027 from International Searching Authority (KIPO) dated Sep. 29, 2011.
(Continued)

*Primary Examiner* — Matthew E Heneghan
(74) *Attorney, Agent, or Firm* — Glass and Associates; Kenneth Glass

(57) ABSTRACT

A method switches master/slave timing in a communication network without traffic disruption. The method includes a master device informing a slave of timing loss. The master device additionally begins transmitting with timing from a local reference clock and begins receive timing recovery. The slave freezes its receive timing recovery and locks its transmit clock. The master device transitions its transmit timing to use the recovered receive clock. The slave gradually switches to transmitting using its local clock signal. The method may be used in synchronous Ethernet networks.

11 Claims, 4 Drawing Sheets

(51) Int. Cl.
*H04L 12/42* (2006.01)
*H04L 12/437* (2006.01)
*H04L 7/033* (2006.01)

(58) Field of Classification Search
USPC ..... 370/350, 395.62, 503; 375/354, 357
See application file for complete search history.

(56) References Cited

U.S. PATENT DOCUMENTS

| | | | | |
|---|---|---|---|---|
| 7,046,052 | B1 * | 5/2006 | Percey et al. | 327/115 |
| 7,280,550 | B1 | 10/2007 | Rosenboom | |
| 7,280,564 | B1 * | 10/2007 | Geile et al. | 370/507 |
| 7,340,662 | B1 * | 3/2008 | McElwee et al. | 714/742 |
| 7,715,467 | B1 * | 5/2010 | Burney | 375/219 |
| 2004/0196872 | A1 * | 10/2004 | Nakamura | 370/512 |
| 2006/0244501 | A1 * | 11/2006 | Foerster et al. | 327/207 |
| 2006/0269029 | A1 | 11/2006 | Repko et al. | |
| 2007/0116059 | A1 * | 5/2007 | Hipp | 370/503 |
| 2009/0141725 | A1 * | 6/2009 | Bedrosian | 370/392 |
| 2009/0225779 | A1 | 9/2009 | Diab et al. | |
| 2010/0118721 | A1 | 5/2010 | Hiroshi | |
| 2010/0316069 | A1 * | 12/2010 | Fourcand | 370/503 |
| 2012/0218986 | A1 * | 8/2012 | Bedrosian | 370/350 |

FOREIGN PATENT DOCUMENTS

| | | |
|---|---|---|
| JP | 11-008643 | 1/1999 |
| JP | 2005-328514 | 11/2005 |
| WO | 2008/129593 | 10/2008 |
| WO | WO 2008/129593 | 10/2008 |

OTHER PUBLICATIONS

Written Opinion for corresponding application PCT/US2011/021027 from International Searching Authority (KIPO) dated Sep. 29, 2011.

Communication Pursuant to Rules 70(2) and 70a(2) EPC for parallel application EP 11733336.9 issued Apr. 15, 2015 by the European Patent Office.

Extended Search Report for EP11733336.9 issued by European Patent Office Apr. 15, 2015.

International Search Report on corresponding PCT application (PCT/US2011/021027) from International Searching Authority (KIPO) dated Sep. 29, 2011.

Written Opinion on corresponding PCT application (PCT/US2011/021027) from International Searching Authority (KIPO) dated Sep. 29, 2011.

* cited by examiner

METHOD FOR SWITCHING MASTER/SLAVE TIMING IN A 1000BASE-T LINK WITHOUT TRAFFIC DISRUPTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of U.S. Provisional Application No. 61/294,422, filed on Jan. 12, 2010 and titled "Method for Switching Master/Slave Timing in a 1000BASE-T Link Without Traffic Disruption," the disclosure of which is incorporated herein by reference.

BACKGROUND OF THE INVENTION

The present invention relates generally to clocking of communication circuits, and more particularly to a method for switching master/slave timing in a data communication link, for example, a 1000BASE-T link, without disrupting data traffic on the link.

Devices for communication over a data link often include transmit and receive circuits termed PHYs. PHYs used in loop-timed systems, such as 1000BASE-T Ethernet, operate as either masters or slaves. The PHY at one end of a data link operates as a master and the PHY at the other end operates as a slave. With respect to signal timing, the PHY operating as a master transmits a signal using a reference clock signal for timing, and the PHY operating as a slave transmits a signal using a clock signal recovered from the signal received from the master. Other operational characteristics of the PHYs may also depend on whether a PHY is a master or a slave. For example, a polynomial used for data scrambling in a 1000BASE-T link may have different values in a master than in a slave. Which end of the data link is the master is commonly determined when the link is initialized, for example, using an auto-negotiation process. The auto-negotiation process may take several seconds and during the process generally no payload data is exchanged. Thus, reassignment of the timing master in a data link is generally highly disruptive to data communication on the link.

BRIEF SUMMARY OF THE INVENTION

One aspect of the invention provides a method for reconfiguring a timing relationship in a network, the network comprising network nodes comprising at least one physical layer device, the physical layer devices pair-wise coupled between network nodes with a first physical layer device of each pair operating as a timing master and a second physical layer device of each pair operating as a timing slave, the method comprising: transmitting from the first physical layer device using a reference clock local to the network node of the first physical layer device; transmitting from the second physical layer device using a clock signal produced by a receiver of the second physical layer device; performing timing recovery in a receiver of the first physical layer device; freezing timing recovery in the receiver of the second physical layer device; switching the first physical layer device to transmit using a clock signal produced by the receiver of the first physical layer device; and switching the second physical layer device to transmit using a clock signal local to the network node of the second physical layer device.

Another aspect of the invention provides a network node comprising: a first physical layer device configurable to operate as a timing master or a timing slave; a second physical layer device configurable to operate as a timing master or a timing slave; and phase-locked loop circuitry coupled to the first physical layer device and the second physical layer device, the phase-locked loop circuitry configured to produce a local clock signal based on a clock signal produced by the first physical layer device or a clock signal produced by the second physical layer device, the network node configurable to operate in a master timing mode, a feedthrough timing mode, or a slave timing mode, wherein the timing mode of the network node is reconfigurable substantially without communication errors to or from the network node.

Another aspect of the invention provides an Ethernet network node, the Ethernet network node configured to act as a master or a slave for a data link with respect to another node depending on the outcome of an auto-negotiation sequence between the Ethernet network node and the other node for the data link, the Ethernet network node configured to serve as a timing master for the data link while the Ethernet network node is configured to act as a slave for the data link in the event the Ethernet network node receives information that the Ethernet network node should serve as a timing master.

Another aspect of the invention provides in an Ethernet network, a process for reconfiguring a timing relationship in a network, comprising: receiving an indication by a PCS level slave node that a PCS level master node has had a timing loss; and switching, by the PCS level slave node, to use of a reference clock derived from a third node for transmission of data from the PCS level slave node to the PCS level master node.

These and other aspects of the invention are more fully comprehended upon review of this disclosure.

DETAILED DESCRIPTION

Figure 1:
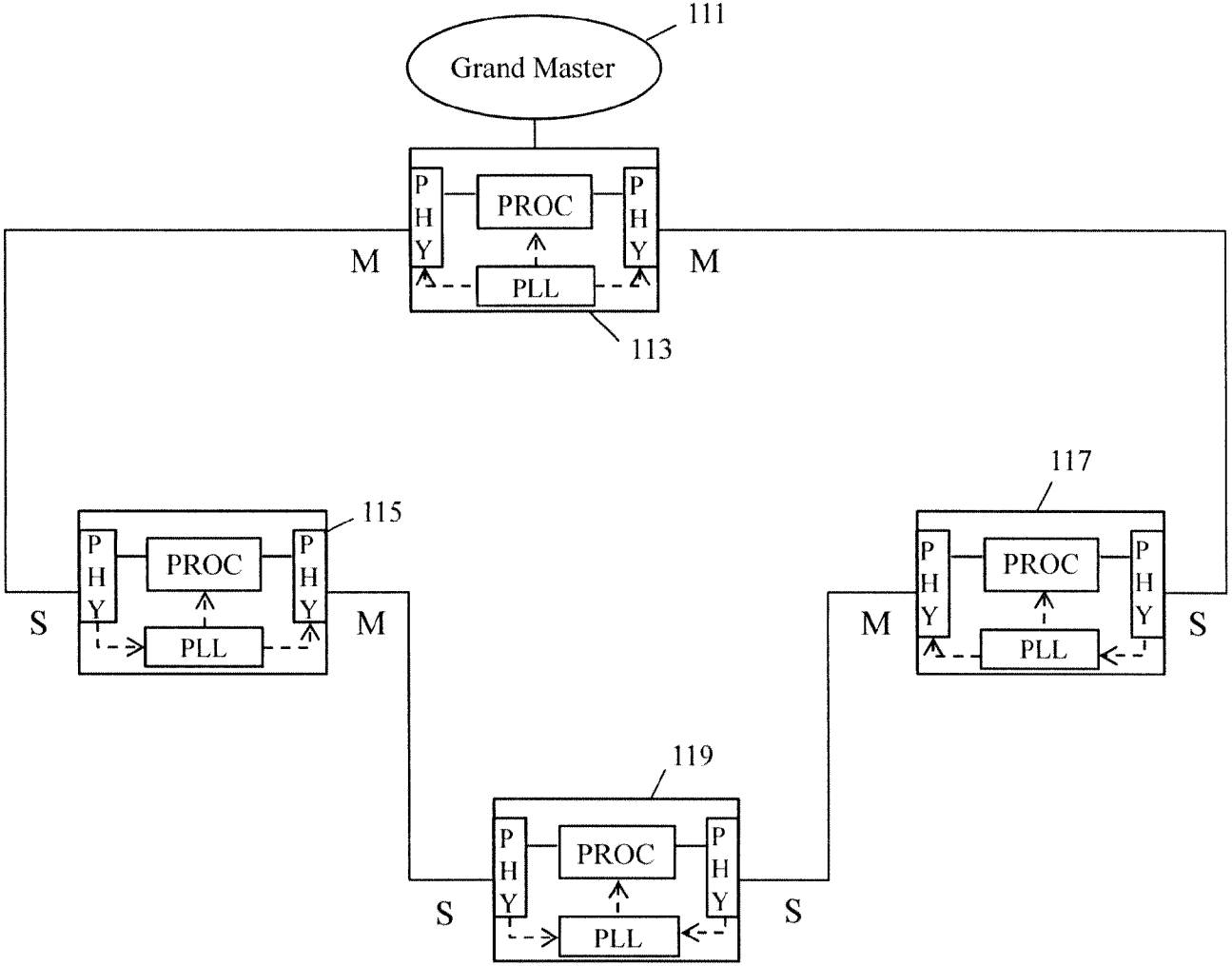
FIG. 1 is a block diagram of communication network in accordance with aspects of the invention.

FIG. 1 is a block diagram of a communication network in accordance with aspects of the invention. The communication network includes four network nodes: a first node 113, a second node 115, a third node 119, and fourth node 117. Although four nodes are illustrated in FIG. 1, a network may have a greater number of nodes. The network of FIG. 1 uses a ring topology with the first node connected to the second node, the second node connected to the third node, the third node connected to fourth node, and the fourth node connected to the first node. Other network topologies that include redundant links may also be used. Each node includes a left-side PHY, a right-side PHY, PLL circuitry, and processing circuitry. As illustrated, each PHY connects to a data link. The processing circuitry processes data communication between the PHYs and between the PHYs and other devices, for example, a wireless transceiver, connected to or included in the network node. The designation of a PHY as left-side or right-side is only for convenience in referencing the figures and does not connote a particular physical location in a network node. Additionally, some network nodes may have more than two PHYs.

The PLL circuitry supplies clock signals to the PHYs and the processing circuitry. In some embodiments, the PLL circuitry may be included in one or both of the PHYs. The PLL circuitry may receive clock signals recovered by the PHYs and from a local reference clock with the signal used to generate the clock signals supplied by the PLL circuitry depending on a timing mode of the node. In some embodiments, the local reference clock includes a crystal oscillator. A node may operate in a master timing mode with the PLL circuitry, or some external circuitry, supplying clock signals to the left-side PHY, the right-side PHY, and the processing circuitry that are generated from the local reference clock. In FIG. 1, the first node 113 operates in the master timing mode. In the master timing mode, the PHYs in the node operate as masters.

A node may also operate in a feedthrough timing mode with the PLL circuitry supplying clock signals to the left-side PHY and the processing circuitry that are generated from the clock signal recovered by right-side PHY. This feeds timing information from the node coupled to the right-side PHY to the node coupled to the left-side PHY. The left-side and right-side PHYs may be swapped in the feedthrough timing mode to feed timing information in the opposite direction. In the feedthrough timing mode, the PHY receiving timing from another node operates as a slave and the other PHY operates as a master. In FIG. 1, the second node 115 and fourth node 117 operate in the feedthrough timing mode.

A node may also operate in a slave timing mode with the PLL circuitry supplying clock signals to the processing circuitry generated from the clock signal recovered by the left-side (or right-side) PHY, and with the left-side and right-side PHYs operating as slaves. Whether the clock signal recovered by the left-side or right-side PHY is used may depend, for example, on the distance (in terms of nodes) from the PHY to the master timing node. In FIG. 1, the third node 119 operates in the slave timing mode. An "M" or "S" near a PHY in FIG. 1 indicates whether the PHY is operating as master or slave.

The timing mode of each network node may be determined by an initialization or configuration process. When the communication network is a synchronous Ethernet network, auto-negotiation may be used to configure the timing modes of the nodes. A scheme for assigning timing modes to the nodes may begin by establishing the node with the most accurate local reference clock to operate in the master timing mode. The other nodes may then operate in the feedthrough timing mode with timing fed from the PHY closest to the master to the more distant PHY. The node receiving timing on both PHYs may then operate in the slave timing mode. Since the clock signals in all nodes trace to the node operating in master timing mode, that node may be termed the Grand Master. After initial configuration, all nodes in the network operate synchronously.

Figure 2:
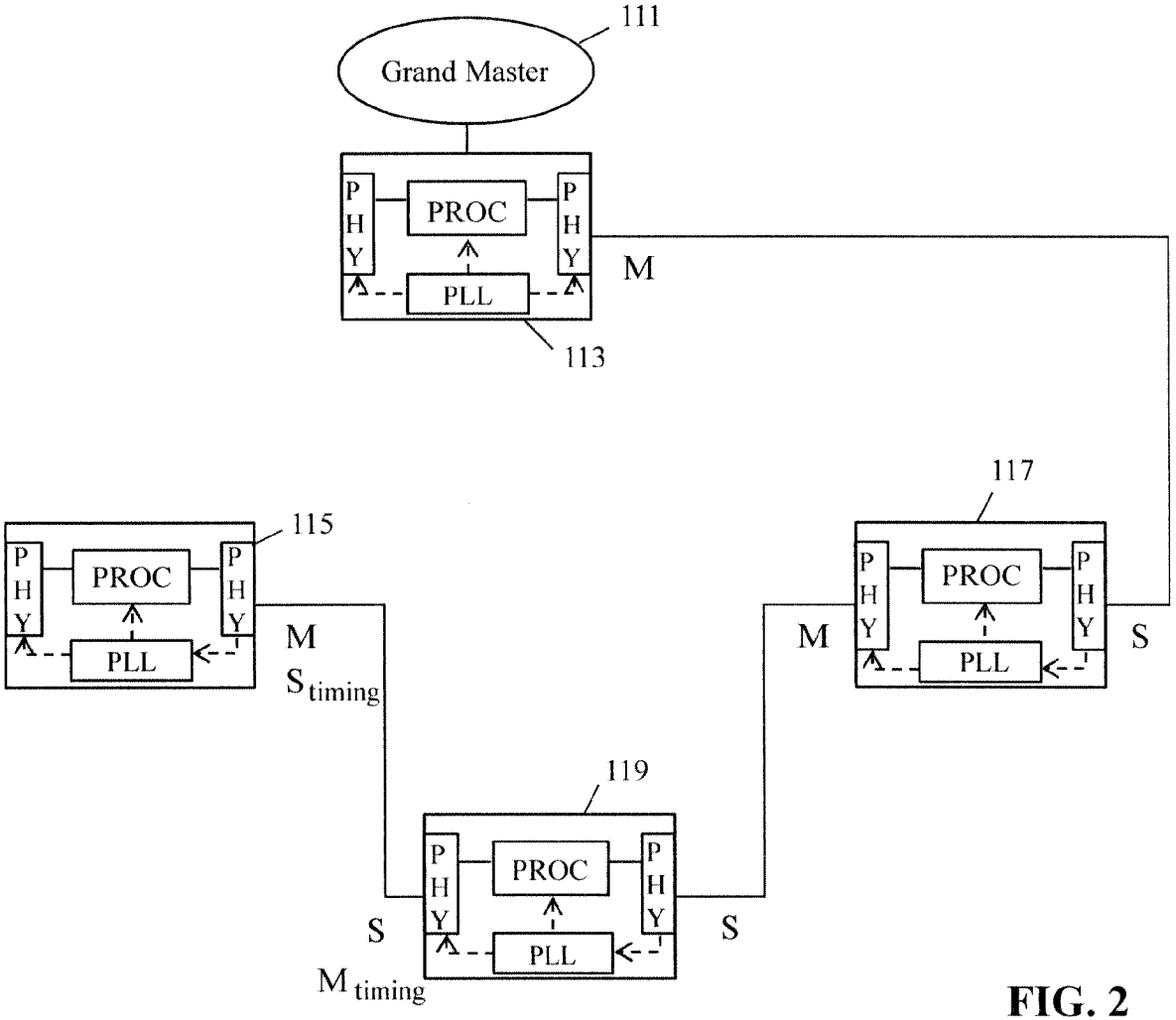
FIG. 2 is a block diagram of communication network in accordance with aspects of the invention.

FIG. 2 shows a block diagram of the communication network of FIG. 1 after the data link between the first node 113 and the second node 115 has dropped. The link may drop, for example, due to signal interference on the link, physical failure of the link, or physical failure of devices connected to the link. Since the second node received timing from the first node over the now dropped link, synchronous operation of the second node cannot continue with the timing modes of FIG. 1. However, by configuring the third node to operate in the feedthrough timing mode to pass timing from its right-side PHY (connected to the fourth node) to its left-side PHY (connected to the second node) and the second node to operate in feedthrough timing mode to receive timing from its right-side PHY (connected to the third node), the network may again operate synchronously. As illustrated in FIG. 2, the reconfigured network passes timing from the first node to fourth node, from the fourth node to the third node, and from the third node to the second node.

Figure 3:
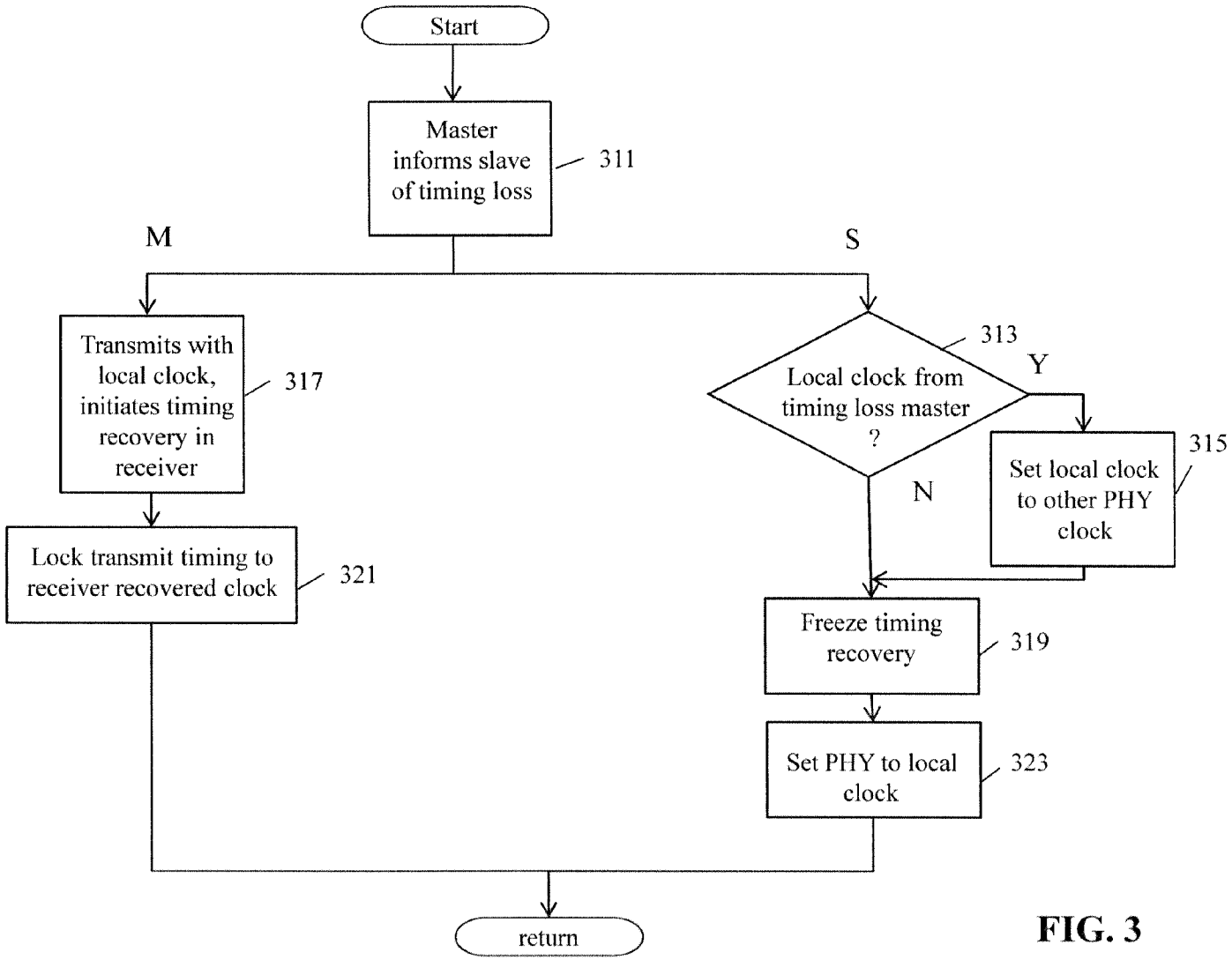
FIG. 3 is a flowchart of a process for reassigning master/slave timing in accordance with aspects of the invention.

FIG. 3 is a flowchart of a process for reconfiguring timing relationships in a network in response to dropping of a link between network nodes. The process will be described with reference to FIGS. 1 and 2 for convenience; however, the process may be used with other network configurations. Although, the data link between the first node 113 and the second node 115 dropped, reconfiguration of the network changes the operation of the link between the second node 115 and the third node 119. Accordingly, the process will be described with reference to the original master and slave on the link between the second node and the third node. That is, master refers to the right-side PHY of the second node and slave refers to the left-side PHY of the third node.

In block 311, the master informs the slave of timing loss. The master may signal the slave, for example, by sending special packets or by sending special symbols. The signaling may utilize protocol layers above the PHYs. In some embodiments, the slave may signal the master of the desire to change timing configurations. Signaling by the slave also may include sending special packets or sending special symbols and utilize protocol layers above the PHYs. In block 313, in response to the information about timing loss, the third network node, which contains the slave, checks the source of its local clock signal. Note that since this node is operating in slave timing mode, the clock signal recovered by either the left-side or right-side PHY may have been selected for use in generating the local clock signal. If the local clock signal was generated from the slave device that received the indication of timing loss in block 311, the process continues to block 315; otherwise, the process continues to block 319. In block 315, the PLL circuitry in the third node switches to using the clock signal recovered by the right-side PHY.

In block 317, the master transmits using timing from the local reference clock of the second node. Additionally, the master begins timing recovery on the signal received from the slave.

In block 319, the slave freezes timing recovery on the signal received from the master. Additionally, the slave locks the frequency of the signal it transmits to the master.

In block 321, the master enables its transmit timing to lock to the clock signal recovered by its receiver. Preferably, the master smoothly transitions from transmitting using timing from its local reference clock (as began in block 317) to transmitting with loop timing. A smooth transition has timing characteristics that allow the slave to receive the signal transmitted by the master without bit errors.

In block 323, the slave gradually switches to transmitting using the local clock signal of the third node. Note that after blocks 313, 315, the local clock signal is generated using the right-side PHY, which is connected to the fourth node 117. Gradually switching the transmit timing avoids causing bit errors in data transmission between master and slave. In an embodiment that uses a digital PLL to generate the transmit clock signal, block 323 may include a gradual decay of a frequency term in the digital PLL. Thereafter the process returns. The process performs blocks associated with the master serially and blocks associated with the slave serially. However, the process may perform slave operations in parallel with master operations.

The process reconfigures timing flow in the network so that the slave device operates as a timing master and the master device operates as a timing slave. However, other configurational aspects of the link were not changed by the reconfiguration process. For example, in a 1000BASE-T PHY, PCS level master/slave configuration is unchanged. Thereby, timing synchronization of the network was reconfigured without reinitializing (for example, using auto-negotiation) the network or any link of the network. Although the reconfiguration process was described for a simple network where the master/slave timing was changed for just one link, the process may be applied in an iterative or nested manner to reconfigure multiple links in a more complex network.

Figure 4:
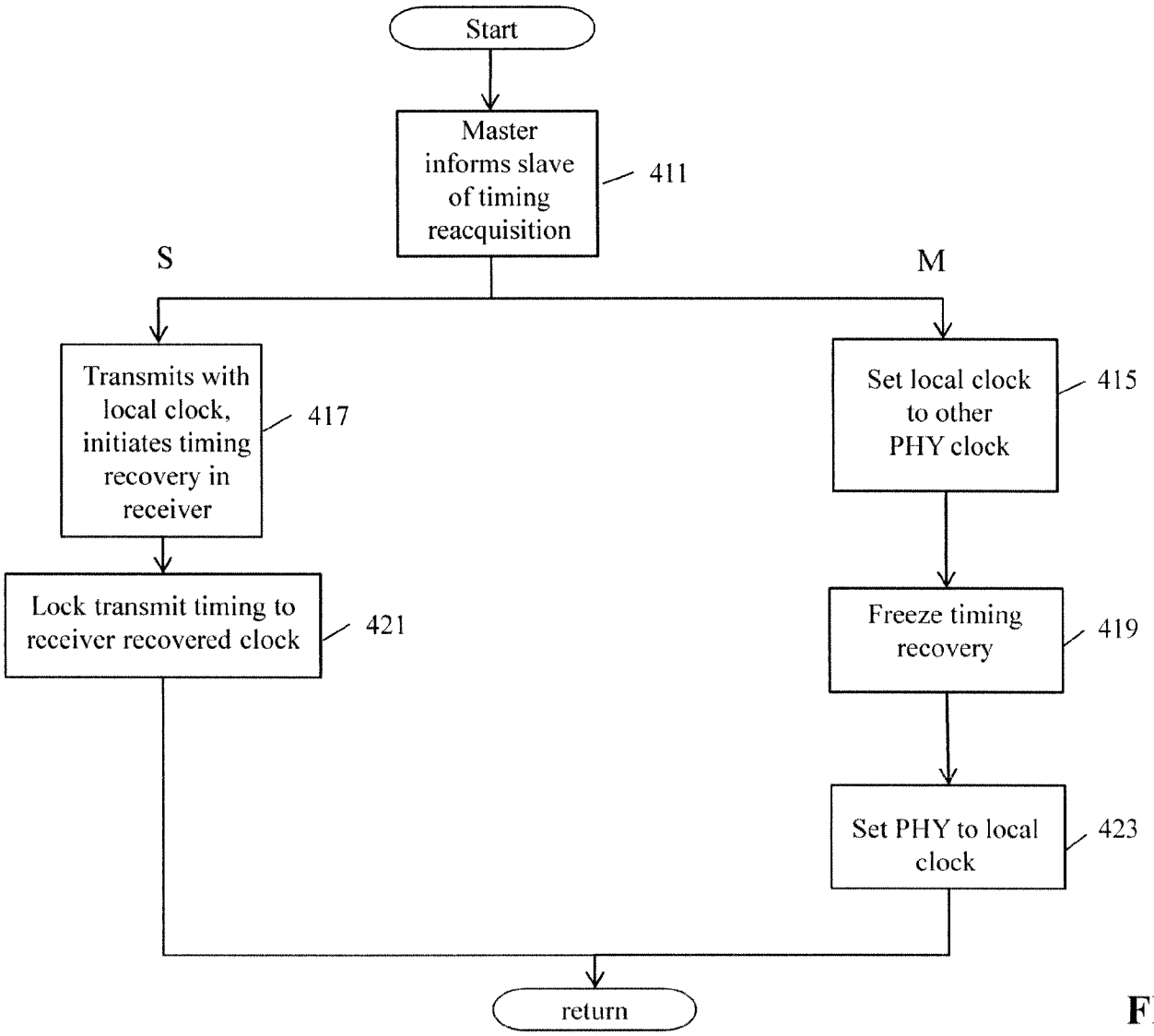
FIG. 4 is a flowchart of a process for restoring master/slave timing in accordance with aspects of the invention.

FIG. 4 is a flowchart of a process for reconfiguring timing relationships in a network in response to restoration of a link between network nodes. The process of FIG. 4 is similar to the process of FIG. 3 and may be used, for example, to restore a network to use timing relationships that existed prior to reconfiguration by the process of FIG. 3. As was done for the reconfiguration process of FIG. 3, the process of FIG. 4 will be described with reference to the original master and slave on the link between the second node and the third node. That is, master refers to the right-side PHY of the second node and slave refers to the left-side PHY of the third node.

In block 411, the master informs the slave of timing reacquisition. The master may signal the slave, for example, by sending special packets or by sending special symbols. In some embodiments, the slave may signal the master of the desire to reconfigure timing. In block 415, the second network node, which contains the master, sets the PLL circuitry in the second node to use the clock signal recovered by the left-side PHY. Additionally, the master locks the frequency of the signal it transmits to the slave.

In block 417, in response to the information about timing reacquisition, the slave continues to transmit using timing from the local PLL clock of the third node. Additionally, the slave begins timing recovery on the signal received from the master.

In block 419, the master freezes timing recovery on the signal received from the slave.

In block 421, the slave enables its transmit timing to lock to the clock signal recovered by its receiver. Preferably, the slave smoothly transitions from transmitting using timing from its local PLL clock to transmitting with loop timing. A smooth transition has timing characteristics that allow the master to receive the signal transmitted by the slave without bit errors.

In block 423, the master gradually switches to transmitting using the local clock signal of the second node. Note that after block 415, the local clock signal is generated using the left-side PHY, which is connected to the first node 113. Gradually switching the transmit timing avoids causing bit errors in data transmission between master and slave. In an embodiment that uses a digital PLL to generate the transmit clock signal, block 423 may include a gradual decay of a frequency term in the digital PLL. Thereafter the process returns. The process performs blocks associated with the master serially and blocks associated with the slave serially. However, the process may perform slave operations in parallel with master operations.

Although the process reconfigured master and slave timing flow in the network, other configurational aspects of the link were not changed by the reconfiguration process. For example, in a 1000BASE-T PHY, PCS level master/slave configuration is unchanged. Thereby, timing synchronization of the network was restored without reinitializing (for example, using auto-negotiation) the network or any link of the network. Although the restoration process was described for a simple network where the master/slave timing was changed for just one link, the process may be applied in an iterative or nested manner to reconfigure multiple links in a more complex network.

Although the invention has been discussed with respect to various embodiments, it should be recognized that the invention comprises the novel and non-obvious claims supported by this disclosure.

What is claimed is:

[1. A method for reconfiguring a timing relationship in a network, the network comprising network nodes comprising at least one physical layer device, the physical layer devices pair-wise coupled between network nodes with a first node with a first physical layer device operating as a master and a second node with a second physical layer device operating as a slave, the method comprising:

transmitting signals from the first physical layer device of the first node to the second physical layer device of the second node using a reference clock local to the first node;

transmitting signals from the second physical layer device of the second node to the first physical device of the first node using a clock signal recovered from signals received from the first physical layer device of the first node;

performing timing recovery, by the first node, on signals received from the second node;

freezing timing recovery, by the second node, of signals received from the first node;

switching the first physical layer device of the first node to transmit signals using a clock signal recovered from signals received from the second physical layer device of the second node; and switching the second physical layer device of the second node to transmit signals using a clock signal local to the second node.]

[2. The method of claim 1, wherein switching the first physical layer device to transmit using a clock signal produced by the receiver of the first physical layer device and switching the second physical layer device to transmit using a clock signal local to the network node of the second physical layer device are performed substantially without bit errors in communication between the first physical layer device and the second physical layer device.]

3. The method of claim [1] *12*, wherein additional configurational aspects are associated with a physical layer device operating as a master or as a slave, and wherein the [reconfiguration of timing] *change of operation from the first configuration to the second configuration* is performed without modifying the additional configurational aspects.

4. The method of claim 3, wherein the additional configurational aspects comprise a scrambling polynomial.

5. The method of claim [1] *12*, wherein *said* switching [the first physical layer device to transmit using a clock recovered by the receiver of the first physical layer device ] *of the physical layer device of the third network node to transmit using the clock signal responsive to the local*

*reference clock of the third network node* comprises decaying a frequency term in a phase-locked loop used for timing of transmission from the first physical layer device *of the second network node.*

[6. The method of claim 1, wherein switching the second physical layer device to transmit using a clock signal local to the network node of the second physical layer device comprises decaying a frequency term in a phase-locked loop used for timing of transmission from the second physical layer device.]

[7. The method of claim 1, further comprising transmitting a request to reconfigure timing from the first physical layer device to the second physical layer device.]

[8. The method of claim 1, further comprising transmitting a request to reconfigure timing from the second physical layer device to the first physical layer device.]

[9. The method of claim 1, wherein the network nodes further comprise phase-locked loop circuitry coupled to the physical layer devices of the network node and configured to supply the clock signal local to the network node sourced from clocks recovered by the physical layer devices of the network node, the method further comprising:

determining the source of the clock signal local to the network node of the second physical layer device; and when the source of the clock signal local to the network node of the second physical layer device is the second physical layer device, switching the source to a clock signal recovered from another physical layer device of the network node of the second physical layer device.]

[10. The method of claim 1, wherein switching the first physical layer device of the first node to transmit signals using the clock signal recovered from signals received from the second physical layer device of the second node is accomplished without performing an auto-negotiation between the first node and the second node.]

[11. The method of claim 1, wherein switching the first physical layer device of the first node to transmit signals using the clock signal recovered from signals received from the second physical layer device of the second node is accomplished without reinitializing a link between the first node and the second node.]

*12. A method for reconfiguring a timing relationship in a network, the network comprising at least three network nodes each comprising a respective physical layer device, the physical layer devices pair-wise coupled between respective network nodes with a physical layer device of a first of each pair operating as a timing master and a physical layer device of a second of each pair operating as a timing slave, the method comprising:*

*operating in a first configuration of synchronous operation wherein a first of the network nodes provides timing for a second of the network nodes over the respective pair-wise coupling of physical layer devices, and the second of the network nodes operates in a feedthrough timing mode thus providing timing to a third of the network nodes over the respective pair-wise coupling of physical layer devices from the timing provided by the first network node, wherein the physical layer device of the second of the network nodes operates as a timing master and the physical layer device of the third network node acts as a timing slave;*

*detecting at the second network node that a data link between the first network node and the second network node has been dropped;*

*informing, from the second network node to the third network node, responsive to said detection, that a configuration change is desired to a second configuration of synchronous operation;*

*transmitting signals from the physical layer device of the second network node to the physical layer device of the third network node using timing from a reference clock local to the second network node;*

*freezing timing recovery in a receiver of the physical layer device of the third network node thereby locking the timing of the physical layer device of the third network node to a local reference clock of the third network;*

*performing timing recovery in a receiver of the physical layer device of the second network node from a signal received from the physical layer device of the third network node;*

*switching the physical layer device of the second network node to transmit using timing locked to a clock signal recovered by the receiver of the physical layer device of the second network node; and*

*switching the physical layer device of the third network node to transmit signals using a clock signal responsive to the local reference clock of the third network node thereby operating in a second configuration wherein the third network node provides timing for the second network node over the respective pair-wise coupling of physical layer devices.*

*13. The method of claim 12, further comprising prior to said freezing timing recovery in the receiver of the physical layer device of the third network node,*

*switching, in the event that the third network node was using a local reference clock recovered from the second network node, the local reference clock of the third network node to be responsive to an additional physical layer device of the third network node.*

*14. The method of claim 12, wherein said switching of the physical layer device of the second network node to transmit signals using timing locked to the clock signal recovered by the receiver of the physical layer device of the second network node is performed smoothly thus exhibiting timing characteristics that allow the physical layer device of the third network device to receive a signal transmitted from the physical layer device of the second network node substantially without bit errors.*

*15. The method of claim 12, wherein the network further comprises a fourth network node in communication with the first network node and arranged to receive timing therefrom, the method further comprising: receiving timing from said fourth network node at said additional physical layer device of the third network node.*

*16. A network arranged for reconfigurable timing, the network comprising:*

*three network nodes each comprising a respective physical layer device, the physical layer devices pair-wise coupled between respective network nodes with a physical layer device of a first of each pair operating as a timing master and a physical layer device a second of each pair operating as a timing slave, the network nodes arranged to operate in a first configuration of synchronous operation wherein a first of the network nodes provides timing for a second of the network nodes over the respective pair-wise coupling of physical layer devices, and the second of the network nodes operates in a feedthrough timing mode thus providing timing to a third of the network nodes over the respective pair-wise coupling of physical layer devices from the timing provided by the first network node, wherein the physical layer device of the second of the network nodes operates as a timing master and the physical*

*layer device of the third network node acts as a timing slave, the network further arranged to:*

*detect at the second network node that a data link between the first network node and the second network node has been dropped;*

*inform, from the second network node to the third network node, responsive to said detection, that a configuration change is desired to a second configuration of synchronous operation;*

*transmit signals from the physical layer device of the second network node to the physical layer device of the third network node using timing from a reference clock local to the second network node;*

*freeze timing recovery in a receiver of the physical layer device of the third network node so as to lock the timing of the physical layer device of the third network node to the local reference clock of the third network;*

*perform timing recovery in a receiver of the physical layer device of the second network node from a signal received from the physical layer device of the third network node;*

*switch the physical layer device of the second network node to transmit using timing locked to a clock signal recovered by the receiver of the physical layer device of the second network node: and*

*switch the physical layer device of the third network node to transmit signals using a clock signal responsive to the local reference clock of the third network node thereby operating in a second configuration wherein the third network node provides timing for the second network node over the respective pair-wise coupling of physical layer devices.*

*17. The network according to claim 16, wherein prior to said freezing timing recovery in the receiver of the physical layer device of the third network node,*

*switching, in the event that the third network node was using a local reference clock recovered from the second network node, the local reference clock of the third network node to be responsive to an additional physical layer device of the third network node.*

*18. The network according to claim 16, further comprising a fourth network node arranged to provide timing to said additional physical layer device of the third network node.*

*19. The network of claim 16, further comprising a fourth network node in communication with the first network node and arranged to receive timing therefrom, said additional physical layer device of the third network node arranged to receive timing from said fourth network node.*

* * * * *